United States Patent [19]
Coe

[11] Patent Number: 5,279,020
[45] Date of Patent: Jan. 18, 1994

[54] ROPE CLUTCH

[75] Inventor: Peter J. Coe, Hayling Island, England

[73] Assignee: Lewmar Marine Limited, Hampshire, England

[21] Appl. No.: 972,291

[22] Filed: Nov. 5, 1992

[30] Foreign Application Priority Data

Nov. 6, 1991 [GB] United Kingdom ............... 9123584

[51] Int. Cl.⁵ .............................................. F16G 11/00
[52] U.S. Cl. .................................. 24/134 P; 24/132 WL; 24/134 N
[58] Field of Search .... 24/134P, 134R, 134N, 132R, 132WL, 68CD

[56] References Cited

U.S. PATENT DOCUMENTS

| | | | |
|---|---|---|---|
| 3,437,981 | 4/1969 | Keller | 34/134 R |
| 3,732,598 | 5/1973 | Hatay | 24/134 N |
| 4,413,382 | 11/1983 | Siegmann | 24/132 R |
| 4,450,603 | 5/1984 | Hirsch | 24/134 N |
| 4,465,011 | 8/1984 | Merry | 24/134 R |
| 4,528,727 | 7/1985 | Adomeit | 24/132 WL |
| 4,669,582 | 6/1987 | Sandreid | 24/132 WL |
| 5,083,350 | 1/1992 | Sandreid | 24/134 R |

FOREIGN PATENT DOCUMENTS 0101616 4/1963 Norway ............... 24/132 R

Primary Examiner—Victor N. Sakran
Attorney, Agent, or Firm—Longacre & White

[57] ABSTRACT

A rope clutch having a plurality of apertured pivoted plates which grip or release a rope passing through their apertures according to the angle they make to the rope, has a mechanism for initiating release of the rope which includes a variable toggle linkage.

6 Claims, 4 Drawing Sheets

ROPE CLUTCH

FIELD OF THE INVENTION

The present invention relates to a rope clutch also known as a rope clamp—for use in sailing boats and the like.

BACKGROUND OF THE INVENTION

It is concerned with clutches of the type shown in U.S. application No. 4,413,382 where a rope passes through a clamping mechanism which includes holes in a plurality of pivotable members, in one attitude of which edges of the holes gripping the rope and in another attitude of which, closer alignment of the axes of the holes and the rope allowing passage of the rope.

Such rope clutches have had the disadvantage that, at high loads it is difficult or impossible to release the rope. To try to overcome this a fixed-pivot toggle mechanism could be used but this does not function well for ropes whose diameters are at an extreme of the working range of the device because the angle of the members in the one attitude will vary with the diameter of the rope and at some angles it would provide poor initial mechanical advantage for the release handle and/or throw excessive strain on that handle.

SUMMARY OF THE INVENTION

The present invention provides a rope clutch having an adaptable link so as to ensure as far as possible that the user of the rope clutch always initiates release at adequate mechanical advantage.

According to the present invention a rope clutch has a variable toggle linkage between a release actuating lever and its clamping mechanism. Such a link has the advantage of ensuring that the user can initiate release of the rope at good mechanical advantage, even when a rope at the extremes of the working range of the clutch is in the device. Alternatively stated, the working range of clutch in relation to rope diameters is less constrained by the need for the user to have adequate mechanical advantage when initiating release.

In a preferred embodiment a pair of parallel link plates are pivotally connected to the release handle and have an aperture, an edge of which defines a plurality of locations at which it may engage an abutment such as a cross pin on the clamping mechanism.

In a preferred embodiment, the cope clutch comprises a series of clamping members each having an opening through which the rope is to pass. The clamping members can pivot about fixed coplanar and parallel axes at their bases and are preferably pivotally joined at the top to a connecting element that ensures that the clamping members remain parallel to each other and a fixed pitch apart. The openings through the clamping members are preferably obliquely angled with respect to the members. In any case, clamping action is produced by a load on the rope pulling the clamping members into an attitude wherein it is trapped in a zig-zag in and between the members.

An actuating lever, which can pivot about a fixed axis, may be pivotally coupled to one or more parallel link members to provide the toggle action between the lever and the clamping mechanism. The other end of each link member engages the clamping mechanism by interaction between an abutment and an aperture with a plurality of engagement locations. The various locations are respectively for use when different rope diameters are to be engaged. By adoption of the appropriate location, a sufficient amount of toggle action and of initial mechanical advantage can be obtained over a wide range of rope sizes, since the adoption allows the nearest possible approach to alignment between the abutment location and the axes of the handle axis and link pivot axis, over a range of clamping member angles.

A means between the link member and the release handle may be included to ensure the release handle and link tend to move in unison until the correct location is adopted. This may be friction between them.

DESCRIPTION OF THE DRAWINGS

A preferred embodiment of the invention will now be described with reference to the accompanying drawings, wherein.

DESCRIPTION OF A PREFERRED EMBODIMENT

Figure 1:
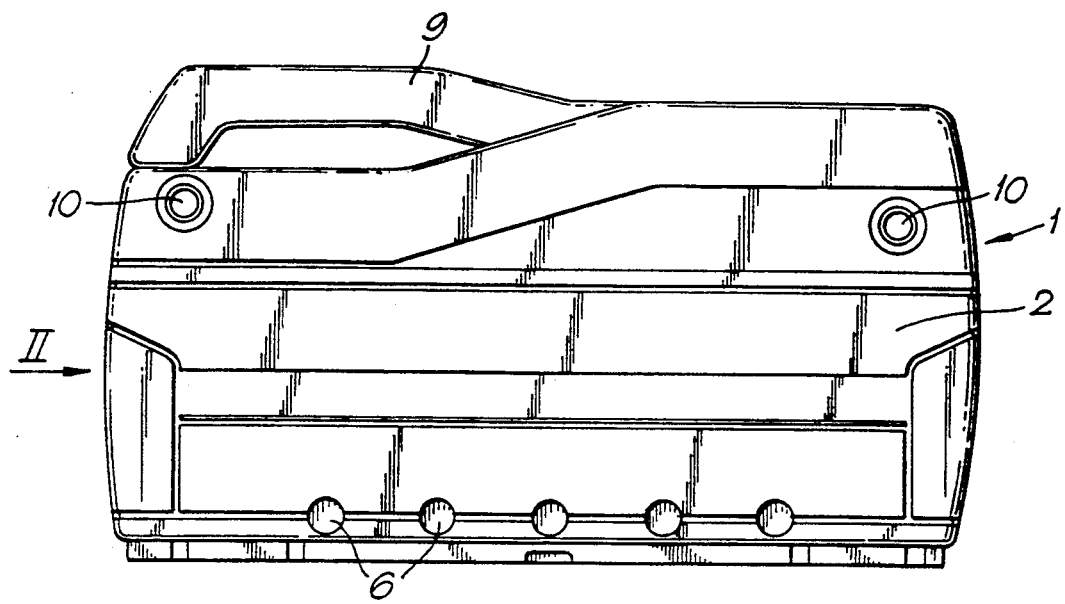
FIG. 1 is a side view of an embodiment of the invention.
Figure 2:
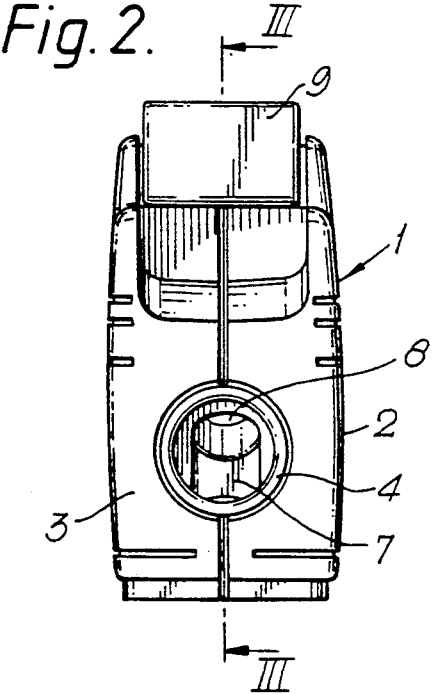
FIG. 2 is an end view on the arrow II, FIG. 1.

As seen in FIG. 1 and 2 the rope clutch 1 has side plates 2,3 trapping between them rings 4,5 defining a rope path through the clutch. Clamping members 7 are pivoted on stub axles 6 and define a variable-width through passage 8 in the path, as will be described in more detail later. A handle 9 is also pivoted between the side plates and is manually pivotable in upwards rotation (clockwise in FIG. 1) to actuate the clamping members. The handle 9 is preferably of a plastics material moulded with an open cellular undersurface.

Screws 10 hold the side plates 2,3 together towards their upper edge; at their lower edge they are held together by claws 11 of plates 12,13 (FIG. 3) engaging in holes in a floor surface 14 of the respective side plates. Claws 11 preferably have wedging side surfaces (not shown) to clamp the side plates together as the plates 12,13 are drawn downwardly.

Figure 3:
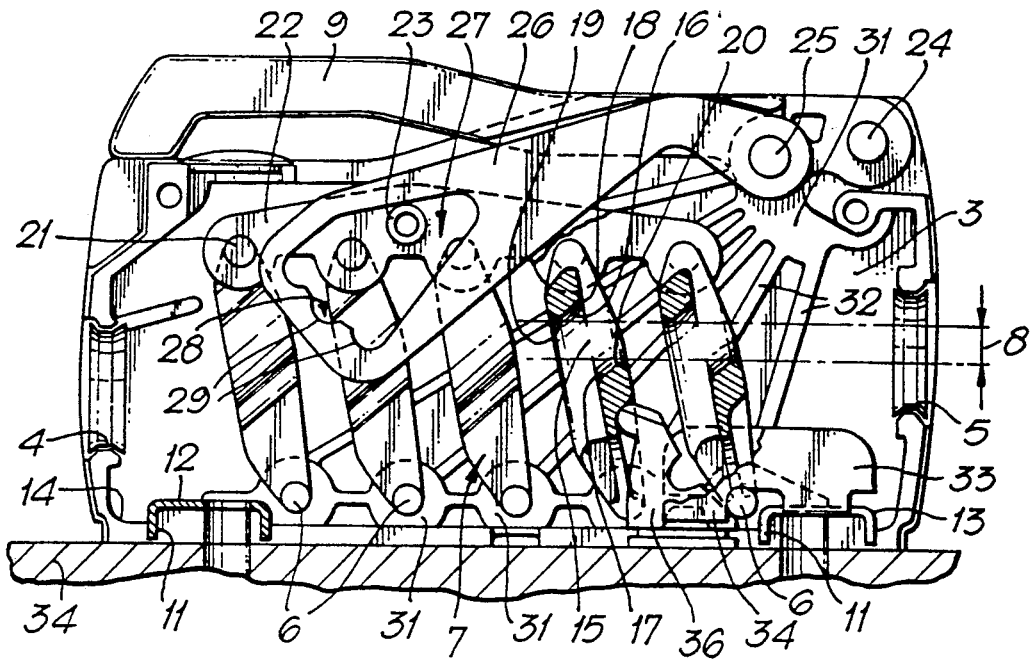
FIG. 3 is a side view as in FIG. 1 but with a side plate removed, and partly in section on the line III—III of FIG. 2.

Referring now to FIG. 3, five clamping members 7 are seen. Each has a forked lower end terminating in outwardly-directed stub axles 6 to engage pivotally with apertures in the side plates and define for the members a plurality of parallel pivotal axes.

Each member 7 has at its upper portion an aperture 15—see the two sectioned members 7 in FIG. 3. In this embodiment the apertures are closed to both lateral sides of the members 7. Each aperture has upper and lower surfaces 16,17 inclined at an angle to the general plane 18 of the member, here at about 65°–70°. However the surfaces as seen in section are somewhat curved and are radiused at 19,20 where they would intersect the faces of the members.

At their upper ends members 7 have outwardly directed stub axles 21. These are engaged by connecting plates 22, one on each lateral side of the members 7, so as to cause all the members to pivot in unison and maintain their planes 18 parallel.

Projecting from the laterally outer sides of connecting plates 22 is a cross pin 23, preferably formed from a rolled cylinder of sprung steel. This is to act as an abutment in a variable toggle mechanism which links the actuating lever, the handle 9, to the clamping mechanism provided by the members 7.

The handle 9 is pivoted between the side plates at axle 24. The toggle mechanism has a pivot axle 25 penetrating the handle and on which link plates 26, lying laterally outside of the handle 9 and the connecting plates 22 can pivot relative to the handle 9. However, the plates 26 have frictional drag resisting that pivoting, preferably provided by friction or spring washers (not shown) entrapped between the pates 26 and the sides of the handle.

Each plate 26 has a generally triangular aperture 27 in it. At its edge 28 remote from the pivot 25 each aperture has a plurality of engagement locations 29 defined by scallops. The distance of the various scallops from the pivot 25 is different, the lowest scallops being nearest and the highest furthest from it.

The abutment 23 projects into the aperture 27 and is for engagement with its edges, and in particular with the locations 29 on edge 28.

FIG. 3 also shows how side plates 2,3 have reinforcement bosses 30,31 around the pivot axis 24 and the axes of the stub axles 6, and strengthening ribs 32 running between them, and how plate 13 has upstanding ears 33 which include an overhanging lug 34 which entraps stub axles 6 of the endmost member 7. Plates 12,13 have apertures for the reception of bolts or the like (not shown) for securing the clutch to a deck 35 of a boat by drawing them downwardly onto that deck. There is also a resilient block 36 entrapped by its base in a slot between the floor surfaces 14 of the plates 2,3 and which acts to urge the members 7 towards an anti-clockwise pivoted attitude.

Figure 4:
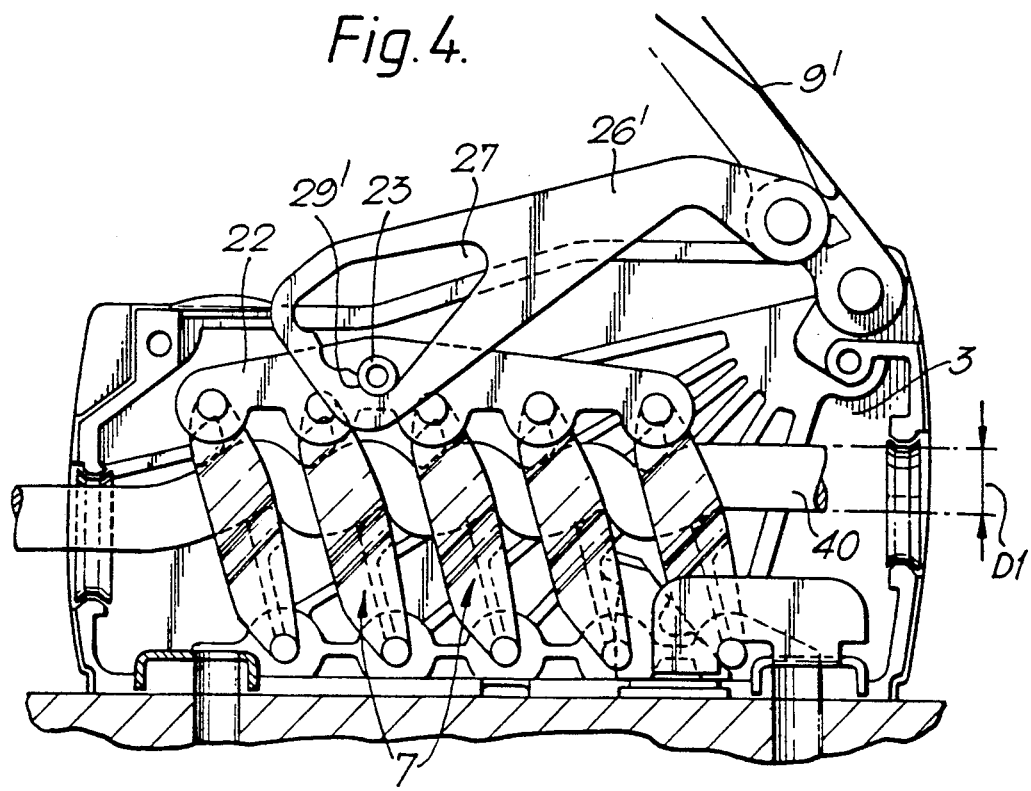
FIGS. 4, 5 and 6 are side views analogous to FIG. 3 but showing the embodiment engaging ropes of various diameters.
Figure 5:
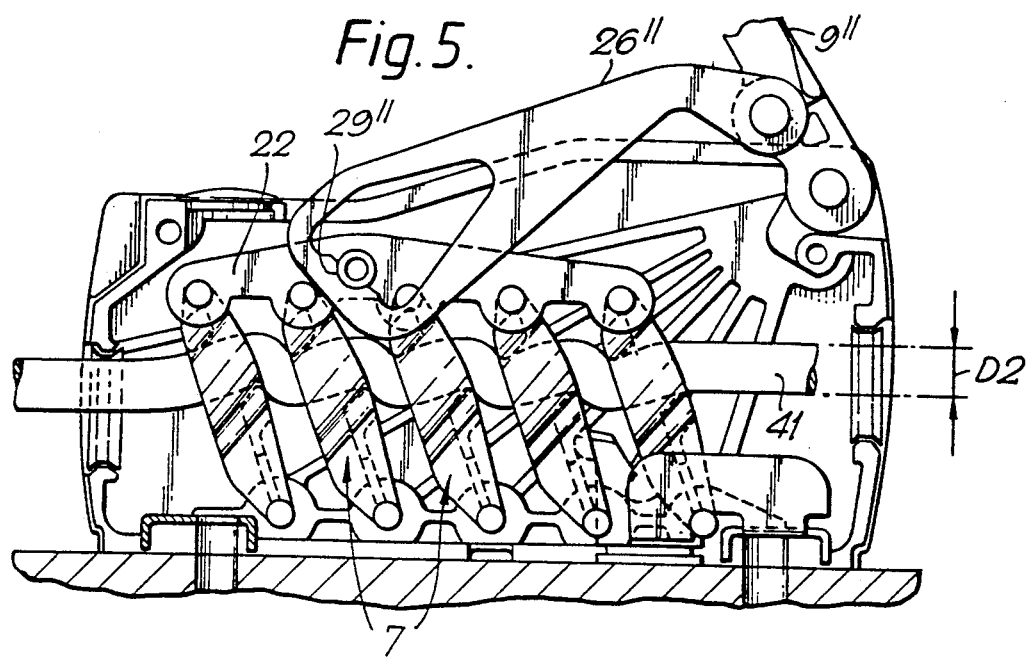
Figure 6:
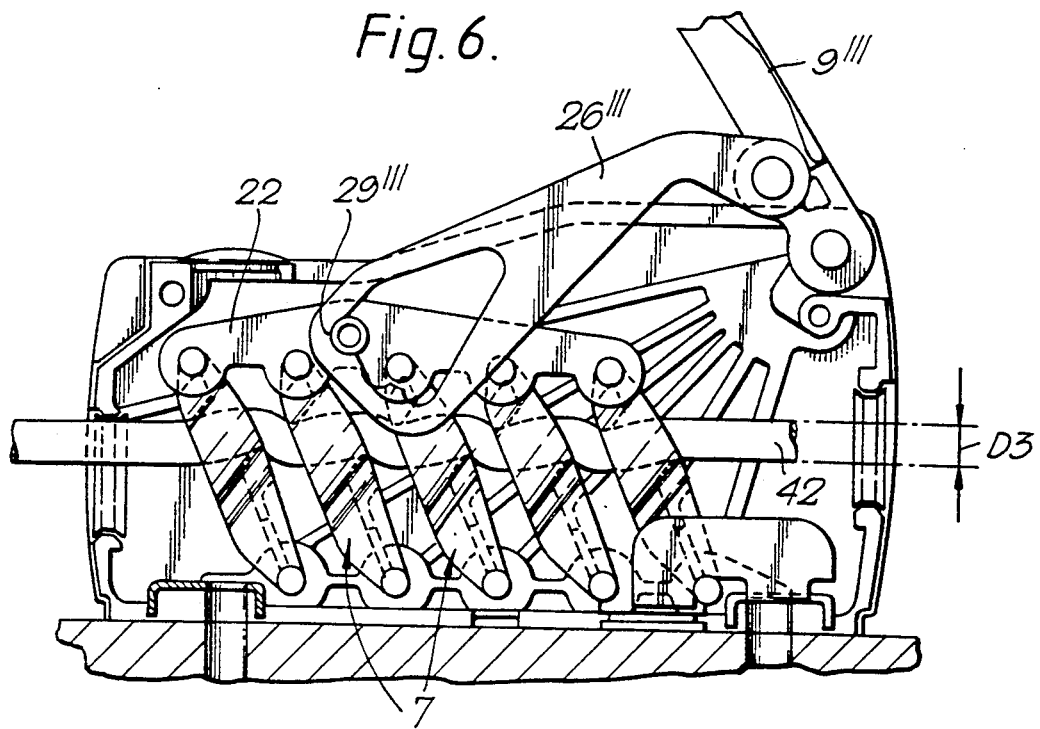

That is a rope-gripping attitude, as will be explained with special reference to FIGS. 4 to 6. One in which the members are pivoted clockwise affords maximum widening of the through-channel 8 and allows release of a rope passing through them; alternatively in this attitude a rope may be loaded into the clutch by being passed into one of the rings 4,5.

A rope 40,41,42 is secured in the rope clutch 1 by the action of the load (to the left in the figures) which tends to increase the obliqueness of the clamping members 7, thereby constricting the channel 8 in which the rope is situated and gripping the rope by the upper and lower edges 16,17 of the apertures 15 and particularly by their radiused corners 19,20. Additional load on the rope 40 has the effect of causing further anticlockwise angling of the clamping members 7 and hence tightening the grip of the rope clutch on the rope 2.

The clamping members 7 are required to take up a variety of clamping angles while clamping a rope, depending upon the diameter of that rope. Compare the angles which the clamping members 7 adopt when in their clamping positions, as seen respectively in FIGS. 4, 5 and 6, where the ropes 40,41,42 are of respectively smaller diameters, D1>D2>D3. Despite these differing angles the fact that locations 29',29",29''' are at different distances from the pivot 25 allows the release handle 9 to initiate release action upon the members 7 through the toggle mechanism at a position 9',9",9''' close enough to the maximum mechanical advantage, over a variety of clamping angles of the members.

Initial lifting of the handle 9 causes the link plates 26 to be dragged with it because there is friction between them and the handle at the pivot 25, until the pin 23 has engaged the appropriate engagement location 29. Further lifting the release handle 9 causes the link plates 26 to pivot about 25, drawing on the connecting plates 22 and pulling the clamping members 7 into an attitude that increases the size of the channel 8 through them until the rope 40,41,42 is released.

Although the above embodiment has been described with a toggle mechanism including a pair of parallel plate link members 26, it is possible to provide a single plate for applications where light loads are involved, or a plurality of three or more where very heavy loads are expected. Likewise the number of clamping members may be greater or less than that shown, even down to a single member if appropriate.

Figure 7:
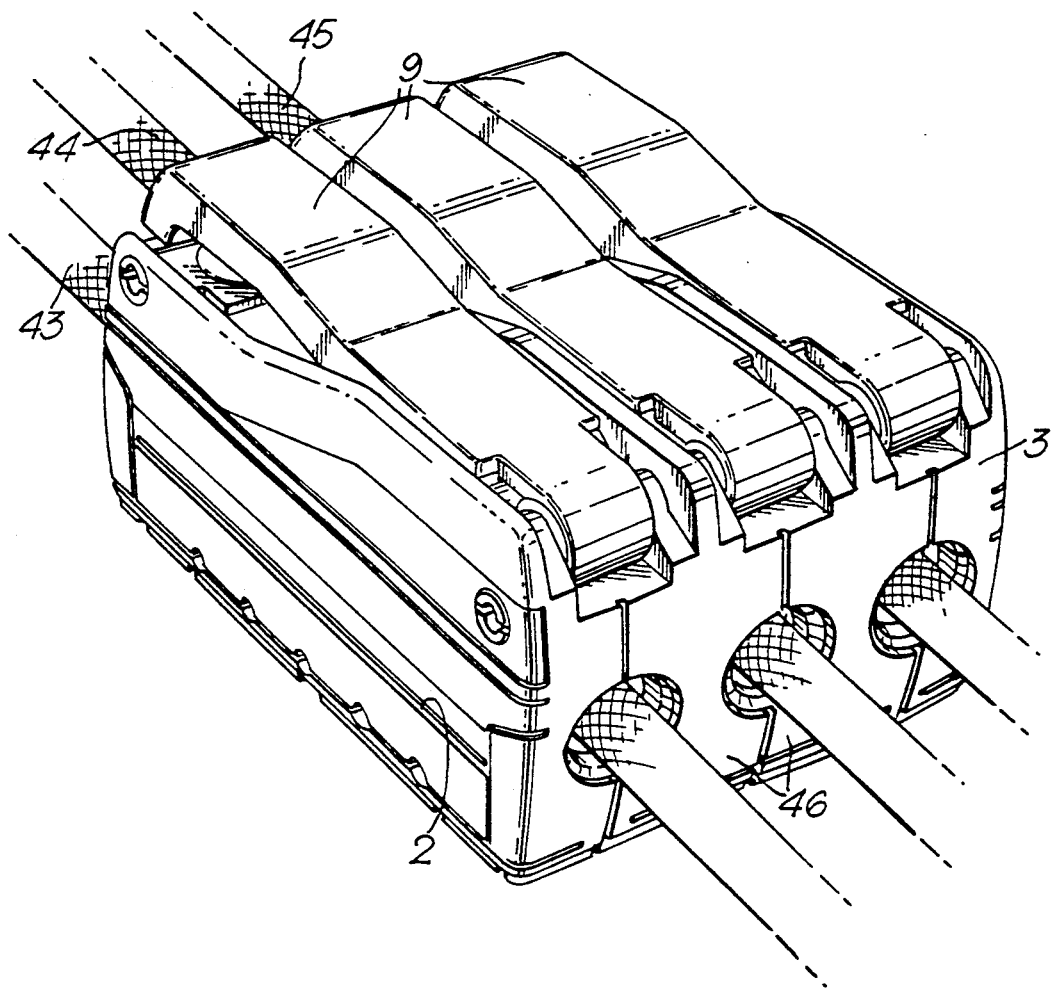
FIG. 7 shows a bank of embodiments.

Units of embodiments of the invention may be banked together as shown in FIG. 7. Here, handles 9 are of separate and individually operable clutches as described, acting on ropes 43,44,45 going to different operating areas of the boat.

Side plate 2 is retained but intermediate side plate 3 is replaced by a double-sided moulding 46 which unifies adjacent units in the bank shown in FIG. 7.

What is claimed is:

1. A rope clutch having at least one pivotally mounted clamping member movable between a first pivoted attitude in which a channel is formed for a rope to pass through at least one clamping member and a second pivoted attitude in which the channel is narrowed so as to grip said rope by the at least one clamping member, and having a release mechanism including an actuating lever for causing pivotal movement of the at least one said clamping member towards the first attitude upon movement of said actuating lever, said release mechanism further including a toggle mechanism having a link with an aperture, which aperture engages between the actuating lever and the at least one clamping member, wherein the aperture has a plurality of engagement position, so as to allow a variety of relationships between the angle of the clamping member is said second attitude and the position of the actuating lever at which said pivotal movement in initiated.

2. A rope clutch according to claim 1 further comprising a plurality of said clamping members each having an angled opening, wherein widening of the channel is caused by general alignment of the axis of said angled openings in the members with the axis of said rope.

3. A rope clutch according to claim 2 wherein a connecting element is pivotally attached to the members to constrain them to pivot together.

4. A rope clutch according to claim 1 wherein the link tends to move with the lever by frictional engagement therebetween.

5. A rope clutch according to claim 4 wherein said frictional engagement tends to cause engagement between said actuating lever and said at least one clamping member at an engagement position optional in relation to a given second pivoted attitude.

6. A rope clutch according to claim 1, further comprising resilient means (36) for engaging, the at least one member (7) to urge it towards the second attitude.

* * * * *